United States Patent
Lee et al.

(10) Patent No.: US 9,894,709 B2
(45) Date of Patent: Feb. 13, 2018

(54) METHOD OF DELIVERING POLICY INFORMATION FOR OFFLOADING BETWEEN DIFFERENT TYPES OF WIRELESS COMMUNICATION SYSTEMS AND ELECTRONIC DEVICE FOR IMPLEMENTING SAME

(71) Applicant: Samsung Electronics Co., Ltd., Gyeonggi-do (KR)

(72) Inventors: Jungwoo Lee, Gyeonggi-do (KR); Soonhyun Cha, Gyeonggi-do (KR); Myungsu Kang, Seoul (KR); Sunmin Hwang, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 119 days.

(21) Appl. No.: 14/686,663

(22) Filed: Apr. 14, 2015

(65) Prior Publication Data
US 2015/0296427 A1    Oct. 15, 2015

(30) Foreign Application Priority Data
Apr. 14, 2014 (KR) .................. 10-2014-0044314

(51) Int. Cl.
*H04W 76/06* (2009.01)
*H04W 8/20* (2009.01)
*H04W 8/00* (2009.01)
*H04W 84/12* (2009.01)

(52) U.S. Cl.
CPC ............. *H04W 76/06* (2013.01); *H04W 8/20* (2013.01); *H04W 8/005* (2013.01); *H04W 84/12* (2013.01)

(58) Field of Classification Search
CPC ................................. H04W 76/06
See application file for complete search history.

(56) References Cited

U.S. PATENT DOCUMENTS

| | | | |
|---|---|---|---|
| 2013/0070738 A1 | 3/2013 | McCann et al. | |
| 2014/0181172 A1* | 6/2014 | Elliott | H04W 28/08 709/201 |
| 2015/0172968 A1* | 6/2015 | Lund | H04W 36/0066 455/411 |
| 2016/0037340 A1* | 2/2016 | Rayment | H04L 63/0853 370/338 |

* cited by examiner

*Primary Examiner* — Jason Mattis

(57) ABSTRACT

Disclosed is a method of delivering policy information for offloading between different types of wireless communication systems by a first electronic device. The method includes: performing a tethering function; determining whether to release the tethering function; identifying a first electronic device connected based on the tethering function when the tethering function is released; delivering policy information for offloading between different types of wireless communication systems to the identified first electronic device; and releasing the tethering function after delivering the policy information to the first electronic device.

20 Claims, 9 Drawing Sheets

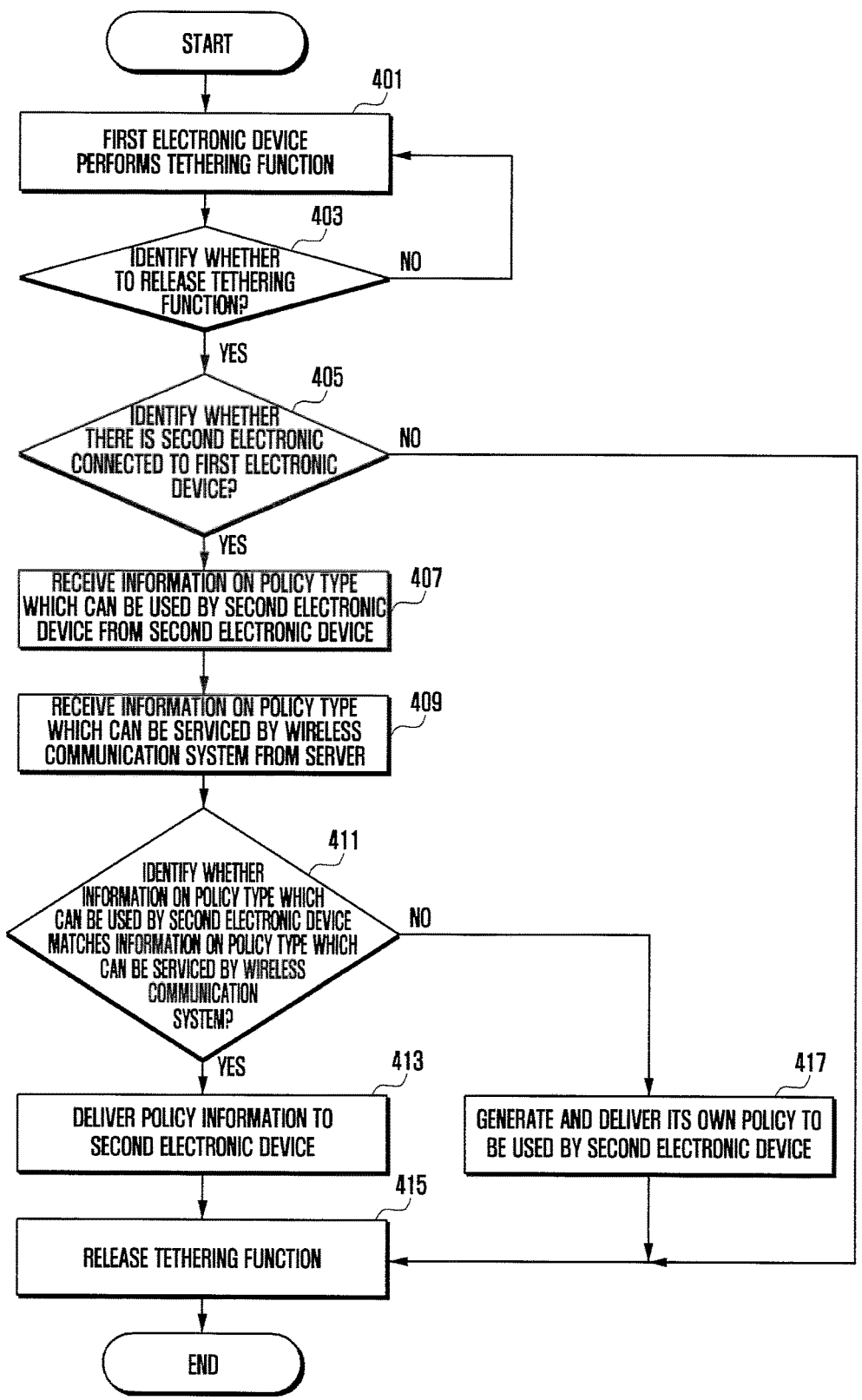

METHOD OF DELIVERING POLICY INFORMATION FOR OFFLOADING BETWEEN DIFFERENT TYPES OF WIRELESS COMMUNICATION SYSTEMS AND ELECTRONIC DEVICE FOR IMPLEMENTING SAME

CROSS-REFERENCE TO RELATED APPLICATION(S) AND CLAIM OF PRIORITY

The present application is related and claims priority from and the benefit under 35 U.S.C. § 119(a) of Korean Patent Application No. 10-2014-0044314, filed on Apr. 14, 2014, which is hereby incorporated by reference for all purposes as if fully set forth herein.

TECHNICAL FIELD

The present disclosure relates generally to a method of delivering policy information for offloading between different types of wireless communication systems to a second electronic device which performs tethering with a first electronic device and an electronic device for implementing the same.

BACKGROUND

In general, a mobile communication system was developed to provide voice services while guaranteeing the activity of users. According to the development of communication technologies, the mobile communication system has gradually expanded its service area up to provide data services as well as voice services and has recently been developed to provide a high speed data service. In the mobile communication system, electronic devices may simultaneously use a plurality of different types of wireless communication systems. In this case, the type of mobile communication system for transmission of particular traffic may be determined based on a preset policy.

Meanwhile, tethering corresponds to an additional function of a mobile phone, wherein one electronic device may provide another electronic device with a network service by using a tethering function. Tethering refers to an additional function of an electronic device enabling a communication function, wherein the electronic device serves as a wireless modem (modulation/demodulation device) in the tethering. "Tether" may mean "rope", and "tethering" may be interpreted as "connected by rope". Tethering refers to a function in which wireless Internet can be used in electronic devices that have communication functions. As an example, such electronic devices can include a notebook computer, a netbook, a tablet PC, a desktop PC, an electronic book terminal, and a PDA by connecting a USB, a Bluetooth device, or electronic devices (for example, mobile phone or cellular phones) that can communicate through Wi-Fi (WLAN) to the electronic devices. For the wireless Internet, a cellular network, a Wireless Broadband Internet (Wibro, wireless high speed portable Internet service), or a WLAN using a wireless access unit may be used. A tethering service uses a wireless communication network, and tethering through a 3GPP wireless communication technology beyond LTE may have a speed which is faster than Wibro or WLAN. Tethering through a wireless communication technology has disadvantages such as high costs and large power consumption, but also has advantages in that Internet access is possible in any place within mobile phone communication coverage. Particularly, the tethering function is very useful because when a user desires to transmit documents or perform an Internet search through a notebook or netbook in an area where access to wireless Internet is not possible, the user can use the Internet through only an electronic device that can use a tethering function.

SUMMARY

An operator who services a mobile communication system may provide a wireless access service to users through various network configurations. For example, the operator may install a 3G/4G access network, and may additionally install a non-3GPP Access Network (AN) in an area where the number of users is large. Further, the operator may establish an agreement with other operators in some areas, and may borrow a non-3GPP AN. According to a network configuration, a WLAN having Access Points (APs) as a medium is generally called an infrastructure mode or an infrastructure network. Further, in a mobile infrastructure mode, a function of the AP supporting the infrastructure mode may be provided to a mobile electronic device.

In a state where a second electronic device is connected to a first electronic device that performs a tethering function through a WLAN communication system to perform wireless communication. That is, in a mobile infrastructure mode state, when the first electronic device receives a policy from a cellular network, the first electronic device performs offloading to the WLAN, and the first electronic device cannot serve as an access point through the WLAN communication system anymore. Further, the second electronic device, which is connected to the first electronic device to perform wireless communication, may have difficulty in accessing the cellular network through the first electronic device. That is, the second electronic device may have difficulty in performing wireless communication using the tethering function of the first electronic device. As a result, when the second electronic device searches for other access points that can be used by the second electronic device to maintain wireless communication or finds no available access point as a result of the search, the second electronic device may access the WLAN communication system through a process of directly searching for the network system.

To address the above-discussed deficiencies, it is a primary object to provide a method of delivering policy information for offloading between different types of wireless communication systems by an electronic device. The method includes: performing a tethering function; determining whether to release the tethering function; identifying a first electronic device connected based on the tethering function when the tethering function is released; delivering policy information for offloading between different types of wireless communication systems to the identified first electronic device; and releasing the tethering function after delivering the policy information to the first electronic device.

In accordance with another aspect of the present disclosure, an electronic device for implementing a method of delivering policy information for offloading between different types of wireless communication systems is provided. The electronic device includes: a communication module for wireless communication between electronic devices; and a processor for performing a tethering function, identifying a first electronic device connected based on the tethering function when the tethering function is released, delivering policy information for offloading between different types of wireless communication systems to the identified first electronic device, and releasing the tethering function after delivering the policy information to the first electronic device.

According to a method of policy information for offloading between different types of wireless communication systems according to various embodiments of the present disclosure and an electronic device for implementing the same, in a state where a second electronic device is connected to an electronic device (for example, a first electronic device) which performs a tethering function to perform a wireless communication, the electronic device (the first electronic device) may not perform the tethering function anymore. At this time, the first electronic device may receive policy information (for example, a policy for offloading between different types of wireless communication systems) which can be used by the second electronic device from a wireless communication system and transmit the received policy information to the second electronic device, or may generate its own policy which can be used by the second electronic device and transmit the generated its own policy to the second electronic device. The second electronic device may efficiently continue to perform wireless communication based on the received policy information or its own policy. That is, the first electronic device may transmit the policy (for example, the policy information or its own policy) to the second electronic device to allow the second electronic device to maintain the wireless communication, and the second electronic device may efficiently maintain the wireless communication based on the received policy.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates a method of delivering a wireless communication system policy to a second electronic device connected to a first electronic device based on whether the first electronic device performs a tethering function according to various embodiments of the present disclosure;

Throughout the drawings, it should be noted that like reference numbers are used to depict the same or similar elements, features, and structures.

DETAILED DESCRIPTION

Figure 1:
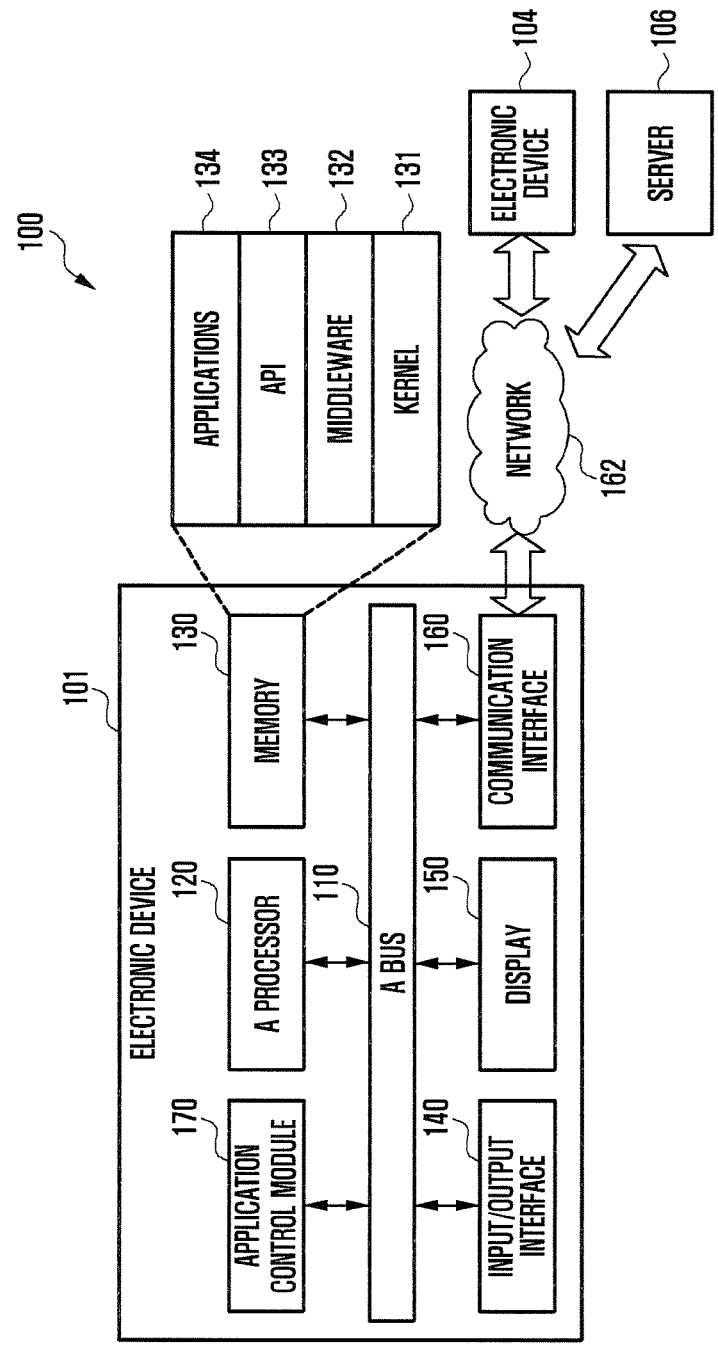
FIG. 1 illustrates a network environment including an electronic device according to various embodiments of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present disclosure are described with reference to the accompanying drawings in detail. Various changes may be made to the disclosure, and the disclosure may have various forms, such that embodiments will be illustrated in the drawings and described in detail. However, such embodiments are not intended to limit the disclosure to the disclosed embodiments and it should be understood that the embodiments include all changes, equivalents, and substitutes within the spirit and scope of the disclosure. Throughout the drawings, like reference numerals refer to like components. It will be understood that the expressions "comprises" and "may comprise" is used to specify presence of disclosed function, operation, component, etc. but do not preclude the presence of one or more functions, operations, components, etc. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof. In the present disclosure, the expression "and/or" is taken as specific disclosure of each and any combination of enumerated things. For example, A and/or B is to be taken as specific disclosure of each of A, B, and A and B.

As used herein, terms such as "first," "second," etc. are used to describe various components, however, it is obvious that the components should not be defined by these terms.

For example, the terms do not restrict the order and/or importance of the corresponding components. The terms are used only for distinguishing one component from another component. For example, a first component may be referred to as a second component and likewise, a second component may also be referred to as a first component, without departing from the teaching of the inventive concept. It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

According to various embodiments of the present disclosure, the electronic device may include devices having an operation support function. Examples of the electronic device may include smartphone, table Personal Computer (PC), mobile phone, video phone, electronic book (e-book) reader, desktop PC, laptop PC, netbook computer, Personal Digital Assistant (PDA), Portable Multimedia Player (PMP), MP3 player, mobile medical appliance, camera, wearable device (e.g. head-mounted device (HMD) such as electronic glasses, electronic clothing, electronic bracelet, electronic necklace, electronic appcessory, electronic tattoo, smartwatch, etc.

According to an embodiment, the electronic device may be a smart home appliance having an operation support function. Examples of the smart electronic appliance as an electronic device may include television, Digital Video Disk (DVD) player, audio player, refrigerator, air-conditioner, vacuum cleaner, electronic oven, microwave oven, laundry machine, air cleaner, set-to box, TV box (e.g. Samsung HomeSync™, apple TV™, and google TV™), game console, electronic dictionary, electronic key, camcorder, and electronic frame, etc.

According to an embodiment, examples of the electronic device may include a medical device (e.g. Magnetic Resonance Angiography (MRA), Magnetic Resonance Imaging (MRI), Computed Tomography (CT)), Navigation device, Global Positioning System (GPS) receiver, Event Data Recorder (EDR), Flight Data Recorder (FDR), car infotainment device, maritime electronic device (e.g. maritime navigation device and gyro compass), aviation electronic device (avionics), security device, vehicle head unit, industrial or home robot, Automatic Teller's Machine (ATM) of financial institution, Point Of Sales (POS), etc.

According to an embodiment, examples of the electronic device may include furniture or a building/structure having a communication function, electronic board, electronic signature receiving device, projector, and metering device (e.g. water, electric, gas, and electric wave metering devices). According to various embodiments, the electronic device may be any combination of the aforementioned devices. According to various embodiments of the present disclosure, the electronic device may be a flexible device. The electronic device is not limited to the aforementioned devices.

Descriptions are made of the electronic devices according to various embodiments with reference to accompanying drawings hereinafter. The term 'user' used in various embodiments may denote a person or a device (e.g. artificial intelligent electronic device) using the electronic device.

FIG. 1 illustrates a network environment 100 including an electronic device 101 according to various embodiments. Referring to FIG. 1, the electronic device 101 may include a bus 110, a processor 120, a memory 130, an input/output interface 140, a display 150, a communication interface 160, and an application control module 170.

The bus 110 may be a circuit for connecting the aforementioned elements to each other and transmitting communication (e.g., a control message) between the aforementioned elements.

For example, the processor 120 may receive an instruction from the aforementioned other elements (e.g., the memory 130, the input/output interface 140, the display 150, the communication interface 160, the application control module 170, etc.) through the bus 110, decipher the received instruction, and perform calculation or data processing according to the deciphered instruction.

The memory 130 may store the command or data received from the processor 120 or other components (e.g. input/output interface 140, display 150, communication interface 160, operation module 170, etc.) or generated by the processor 120 or other components. The memory 130 may store program modules including kernel 131, middleware 132, Application Programming Interface (API) 133, applications 134, etc. Each programming module may be implemented as software, firmware, hardware, and any combination thereof.

The kernel 131 may control or manage the system resources (e.g. bus 110, processor 120, and memory 130) for use in executing the operation or function implemented with the middleware 132, the API 133, or the application 134. The kernel 131 also may provide an interface allowing the middleware 132, API 133, or application 134 to access the components of the electronic device 101 to control or manage.

The middleware 132 may work as a relay of data communicated between the API 133 or application 134 and the kernel 131. The middle 132 may execute control of the task requests from the applications 134 in such a way of assigning priority for use of the system resource (e.g. bus 110, processor 120, and memory 130) of the electronic device to at least one of the applications 134.

The API 133 is the interface for the applications 134 to control the function provided by the kernel 131 or the middleware 132 and may include at least one interface or function (e.g. command) for file control, window control, image control, or text control.

According to various embodiments, the application 134 may include a Short Message Service (SMS)/Multimedia Message Service (MMS) application, an e-mail application, a calendar application, an alarm application, a health care application (e.g., an application for measuring an amount of exercise or blood sugar), and an environmental information application (e.g., an application for providing an atmospheric pressure, humidity, temperature, and the like). Additionally or alternately, the application 134 may include an application related to an information exchange between the electronic device 101 and an external electronic device (e.g., an electronic device 104). The application related to the information exchange may include, for example, a notification relay application for transferring particular information to the external electronic device or a device management application for managing the external electronic device.

For example, the notification relay application may include a function of transferring, to the external electronic device (e.g., the electronic device 104), notification information generated from other applications of the electronic device 101 (e.g., an SMS/MMS application, an e-mail application, a health management application, an environmental information application, and the like). Additionally or alternatively, the notification relay application may receive notification information from, for example, the external electronic device (e.g., the electronic device 104) and provide the received notification information to a user. For example, the device management application may manage (e.g., install, delete, or update) functions for at least a part of the external electronic device (e.g., the electronic device 104) communicating with the electronic device 101 (e.g., turning on/off the external electronic device itself (or some elements thereof) or adjusting brightness (or resolution) of a display), applications operating in the external electronic device, or services (e.g., a telephone call service or a message service) provided from the external electronic device.

According to various embodiments, the application 134 may include an application designated according to an attribute (e.g., a type of the electrode device) of the external electronic device (e.g., the electronic device 104). For example, when the external electronic device is an MP3 player, the application 134 may include an application related to the reproduction of music. Similarly, in the case where the external electronic device is a mobile medical appliance, the application 134 may include an application related to health care. According to an embodiment, the application 134 may include at least one of an application designated to the electronic device 101 and an application received from the external electronic device (e.g., a server 106 or the electronic device 104).

The input/output interface 140 may transfer instructions or data input from a user through an input/output device (e.g., a sensor, a keyboard, or a touch screen) to, for example, the processor 120, the memory 130, the communication interface 160, or the media content sorting module 170 through the bus 110. For example, the input/output interface 140 may provide, to the processor 120, data for a user's touch input through the touch screen. Further, the input/output interface 140 may output, for example, an instruction or data received through the bus 110 from the processor 120, the memory 130, the communication interface 160, and the media content sorting module 170, through an input/output device (e.g., a speaker or display). For example, the input/output interface 140 may output voice data processed through the processor 120 to the user through the speaker.

The display 150 may display various pieces of information (e.g., multimedia data or text data) to a user.

The communication interface 160 may connect communication between the electronic device 101 and the external electronic device (e.g., the electronic device 104 or the server 106). For example, the communication interface 160 communicates with the external device (e.g., the electronic device 104 or the server 106) while being connected to a network 162 through wireless communication or wired communication. The wireless communication may include at least one of, for example, Wi-Fi (Wireless Fidelity), Bluetooth (BT), Near Field Communication (NFC), Global Positioning System (GPS) and cellular communication (e.g., Long Term Evolution (LTE), LTE-A, Code Division Multiple Access (CDMA), Wideband CDMA (WCDMA), Universal Mobile Telecommunication System (UMTS), Wireless Broadband (WiBro), and Global System for Mobile communication (GSM)). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the network 162 may be a communication network. The communication network may include at least one of a computer network, the Internet, the Internet of things, and a telephone network. According to one embodiment, a protocol (e.g., a transport layer protocol, data link layer protocol, or a physical layer protocol) for communication between the electronic device 101 and the external device may be supported by at least one of the application 134, the application programming interface 133, the middleware 132, the kernel 131, and the communication interface 160.

The application control module 170 may process at least some pieces of information acquired from other components (for example, the processor 120, the memory 130, the input/output interface 140, and the communication interface 160), and may provide the processed information to a user through various methods. For example, the application control module 170 may recognize information on access components included in the electronic device 101, store the information on the access components in the memory 130, and execute applications 134 based on the information of the access components.

Figure 2:
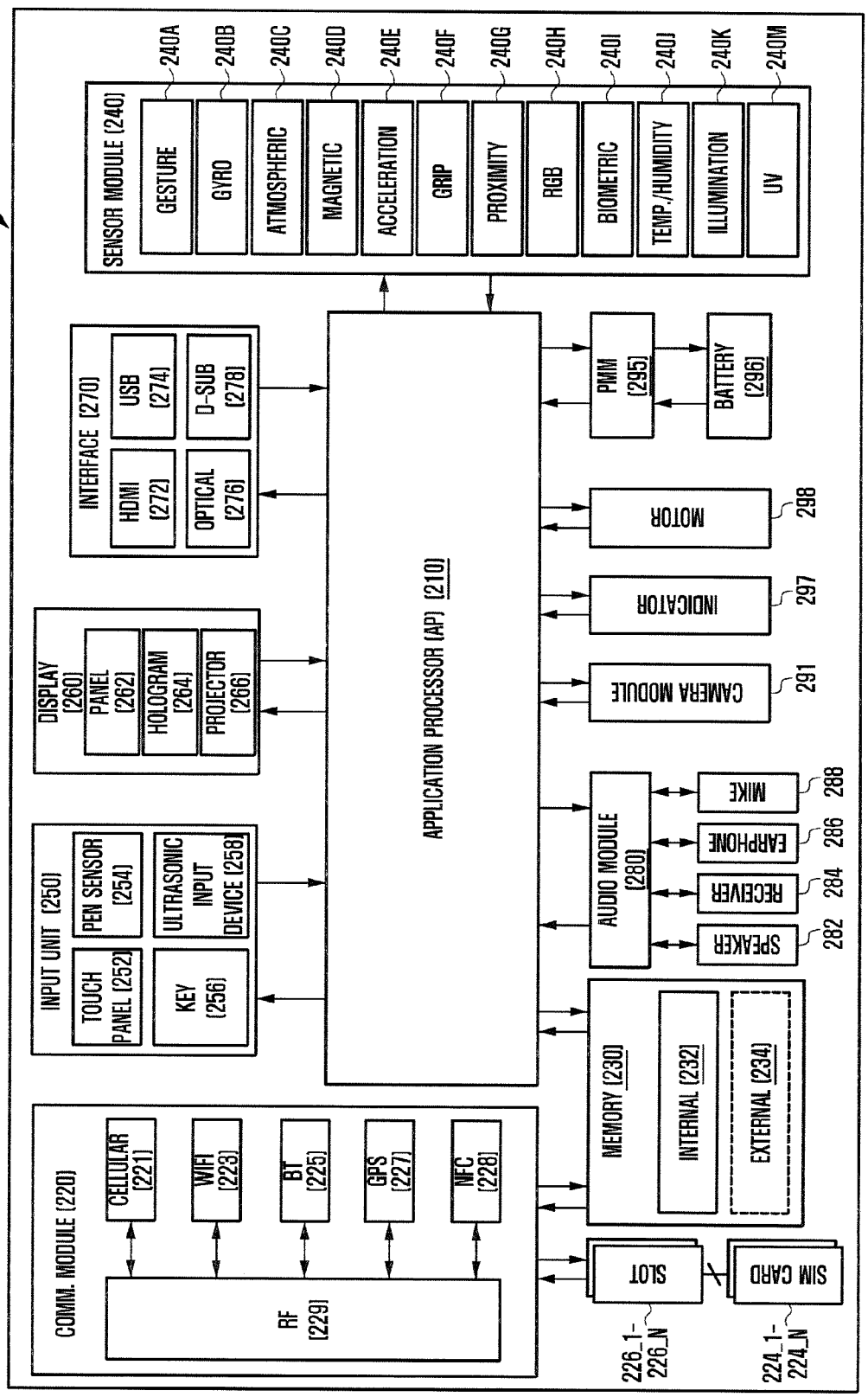
FIG. 2 illustrates a block diagram of an electronic device according to various embodiments of the present disclosure.

FIG. 2 is a block diagram illustrating a configuration of the electronic device according to various embodiments of the present disclosure. The electronic device 201 may be of the whole or a part of the electronic device 101. Referring to FIG. 2, the electronic device 201 may include an Application Processor (AP) 210, a communication module 220, a Subscriber Identity Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may operate an Operating System (OS) and/or application programs to control a plurality of hardware and/or software components connected to the AP 210 and perform data-processing and operations on multimedia data. For example, the AP 210 may be implemented in the form of System on Chip (SoC). According to an embodiment, the AP 210 may include a Graphic Processing Unit (GPU) (not shown).

The communication module 220 (e.g. communication interface 160) may perform data communication with other electronic devices (e.g. electronic device 104 and server 106) through a network. According to an embodiment, the communication module 220 may include a cellular module 221, a Wi-Fi module 223, a BT module 225, a GPS module 227, an NFC module 228, and a Radio Frequency (RF) module 229.

The cellular module 221 implements voice and video communication, text messaging, and Internet access services through a communication network (e.g. LTE, LTE-A, CDMA, WCDMA, UMTS, WiBro, and GSM networks). The cellular module 221 may perform identification and authentication of electronic devices in the communication network using the SIM card 224_1-224_N. According to an embodiment, the cellular module 221 may perform at least one of the functions of the AP 210. For example, the cellular module 221 may perform at least a part of the multimedia control function.

According to an embodiment, the cellular module 221 may include a Communication Processor (CP). The cellular module 221 may be implemented in the form of SOC. Although the cellular module 221 (e.g. communication processor), the memory 230, and the power management module 295 are depicted as independent components separated from the AP 210, the present disclosure is not limited thereto but may be embodied in a way that the AP includes at least one of the components (e.g. cellular module 221).

According to an embodiment, each of the AP 210 and the cellular module 221 (e.g. communication processor) may load a command or data received from at least one of the components on a non-volatile or volatile memory and process the command or data. The AP 210 or the cellular module 221 may store the data received from other components or generated by at least one of other components in the non-volatile memory.

Each of the Wi-Fi module 223, the BT module 225, the GPS module 227, and the NFC module 228 may include a processor for processing the data it transmits/receives. Although the cellular module 221, the Wi-Fi module 223, the BT module 225, the GPS module 227, and the NFC module 228 are depicted as independent blocks; at least two of them (e.g. communication processor corresponding to the cellular module 221 and Wi-Fi processor corresponding to the Wi-Fi module 223) may be integrated in the form of SoC.

The RF module 229 implements data communication, e.g. transmitting/receiving RF signals. Although not depicted, the RF module 229 may include a transceiver, a Power Amp Module (PAM), a frequency filter, and a Low Noise Amplifier (LNA). The RF module 229 also may include the elements for transmitting/receiving electric wave in free space, e.g. conductor or conductive wire. Although FIG. 2 is directed to the case where the Wi-Fi module 223, the BT module 225, the GPS module 227, and the NFC module 228 share the RF module 229, the present disclosure is not limited thereto but may be embodied in a way that at least one of the Wi-Fi module 223, the BT module 225, the GPS module 227, and the NFC module 228 transmits/receives RF signals an independent RF module.

The SIM card 224_1-224_N may be designed so as to be inserted into a slot 226_1-226_N formed at a predetermined position of the electronic device. The SIM card 224_1-224_N may store unique identity information (e.g. Integrated Circuit Card Identifier (ICCID)) or subscriber information (e.g. International Mobile Subscriber Identity (IMSI)).

The memory 230 (e.g. memory 130) may include at least one of the internal memory 232 and an external memory 234. The internal memory 232 may include at least one of a volatile memory (e.g. Dynamic Random Access Memory (DRAM), Static RAM (SRAM), Synchronous Dynamic RAM (SDRAM) or a non-volatile memory (e.g. One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory)

According to an embodiment, the internal memory 232 may be a Solid State Drive (SSD). The external memory 234 may be a flash drive such as Compact Flash (CF), Secure Digital (SD), micro-SD, Mini-SD, extreme Digital (xD), and Memory Stick. The external memory 234 may be connected to the electronic device 201 through various interfaces functionally. According to an embodiment, the electronic device 201 may include a storage device (or storage medium) such as hard drive.

The sensor module 240 may measure physical quantity or check the operation status of the electronic device 201 and convert the measured or checked information to an electric signal. The sensor module 240 may include at least one of gesture sensor 240A, Gyro sensor 240B, barometric sensor 240C, magnetic sensor 240D, acceleration sensor 240E, grip sensor 240F, proximity sensor 240G, color sensor 240H (e.g. Red, Green, Blue (RGB) sensor), bio sensor 240I, temperature/humidity sensor 240J, illuminance sensor 240K, and Ultra Violet (UV) sensor 240M. Additionally or alternatively, the sensor module 240 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 240 may further include a control circuit for controlling at least one of the sensors included therein.

The input device 250 may include a touch panel 252, a (digital) pen sensor 254, keys 256, and an ultrasonic input device 258. The touch panel 252 may be one of capacitive, resistive, infrared, microwave type touch panel. The touch panel 252 may include a control circuit. In the case of the capacitive type touch panel, it is possible to detect physical contact or approximation. The touch panel 252 may further include a tactile layer. In this case, the touch panel 252 may provide the user with haptic reaction.

The (digital) pen sensor 254 may be implemented with a sheet with the same or similar way as touch input of the user or a separate recognition sheet. The keys 256 may include physical buttons, optical key, and keypad. The ultrasonic input device 258 is a device capable of checking data by detecting sound wave through a microphone 288 and may be implemented for wireless recognition. According to an embodiment, the electronic device 201 may receive the user input made by means of an external device (e.g. computer or server) connected through the communication module 220.

The display 260 (e.g. display module 150) may include a panel 262, a hologram device 264, and a projector 266. The panel 262 may be a Liquid Crystal Display (LCD) panel or an Active Matrix Organic Light Emitting Diodes (AMOLED) panel. The panel 262 may be implemented so as to be flexible, transparent, and/or wearable. The panel 262 may be implemented as a module integrated with the touch panel 252. The hologram device 264 may present 3-dimensional image in the air using interference of light. The projector 266 may project an image to a screen. The screen may be placed inside or outside the electronic device. According to an embodiment, the display 260 may include a control circuit for controlling the panel 262, the hologram device 264, and the projector 266.

The interface 270 may include a High-Definition Multimedia Interface (HDMI) 272, a Universal Serial Bus (USB) 274, an optical interface 276, and a D0subminiature (D-sub) 278. The interface 270 may include the communication interface 160 as shown in FIG. 1. Additionally or alternatively, the interface 270 may include a Mobile High-definition Link (MHL) interface, a SD/MMC card interface, and infrared Data Association (irDA) standard interface.

The audio module 280 may convert sound to electric signal and vice versa. At least a part of the audio module 280 may be included in the input/output interface 140 as shown in FIG. 1. The audio module 280 may process the audio information input or output through the speaker 282, the receiver 284, the earphone 286, and the microphone 288.

The camera module 291 is a device capable of taking still and motion pictures and, according to an embodiment, includes at least one image sensor (e.g. front and rear sensors), a lens (not shown), and Image Signal Processor (ISP) (not shown), and a flash (e.g. LED or xenon lamp) (not shown).

The power management module 295 (PMM) may manage the power of the electronic device 201. Although not shown, the power management module 295 may include a Power Management Integrated Circuit (PMIC), a charger Integrated Circuit (IC), a battery, and a battery or fuel gauge.

The PMIC may be integrated into an integrated circuit or SoC semiconductor. The charging may be classified into wireless charging and wired charge. The charger IC may charge the battery and protect the charger against overvoltage or overcurrent. According to an embodiment, the charger IC may include at least one of wired charger and wireless charger ICs. Examples of the wireless charging technology includes resonance wireless charging and electromagnetic wave wireless charging, and there is a need of extra circuit for wireless charging such as coil loop, resonance circuit, and diode.

A battery gauge may measure the residual power of the battery 296, charging voltage, current, and temperature. The battery 296 may store or generate power and supply the stored or generated power to the electronic device 201. The battery 296 may include a rechargeable battery or a solar battery.

The indicator 297 may display operation status of the electronic device 201 or a part of the electronic device, booting status, messaging status, and charging status. The motor 298 may convert the electronic signal to mechanical vibration. Although not shown, the electronic device 201 may include a processing unit (e.g. GPU) for supporting mobile TV. The processing unit for supporting the mobile TV may be able to processing the media data abiding by the broadcast standards such Digital Multimedia Broadcasting (DMB), Digital Video Broadcasting (DVB), and media flow.

The above enumerated components of the electronic device of the present disclosure may be implemented into one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

The term "module" according to the embodiments of the disclosure, means, but is not limited to, a unit of one of software, hardware, and firmware or any combination thereof. The Willi "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of Application-Specific Integrated Circuit (ASIC) chip, Field-Programmable Gate Arrays (FPGAs), and Programmable-Logic Device developed for certain operations.

Figure 3:
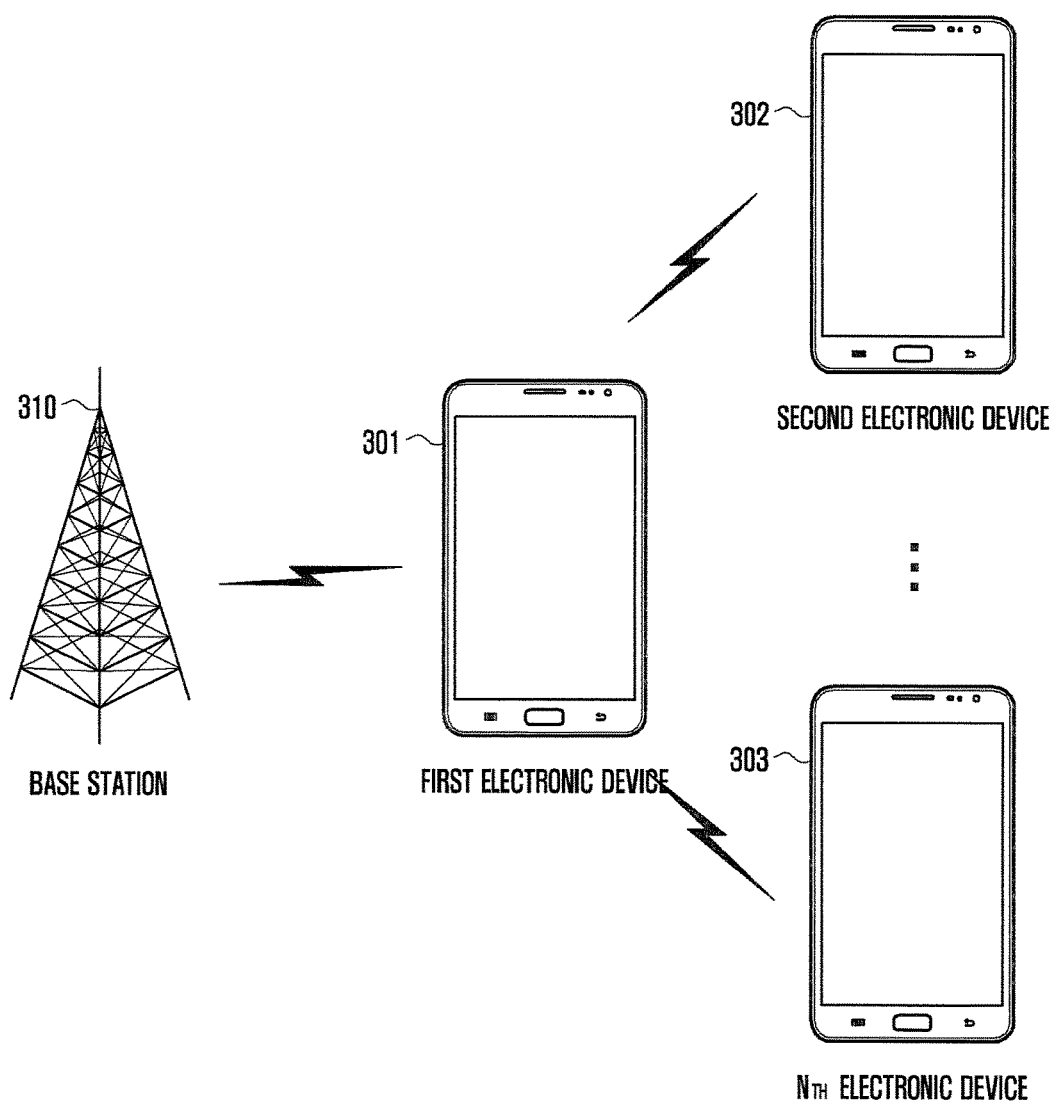
FIG. 3 illustrates an electronic device that performs a function of an access point to allow another electronic device connected to the electronic device to perform wireless communication.

FIG. 3 illustrates that an electronic device performs a function of an access point so that another electronic device connected to the electronic device can perform wireless communication.

FIG. 3 shows a structure in which a mobile electronic device provides a function of an access point supporting an infrastructure mode, which is called a mobile infrastructure mode. In the mobile infrastructure mode, a first electronic device 301 may perform a function of an access point. That is, the first electronic device 301 of FIG. 3 may serve as the network 162 of FIG. 1. Further, although not illustrated, a server connected to a base station 310 of FIG. 3 may be the server 106 of FIG. 1. A second electronic device 302 or other electronic devices 303 may be connected to the base station 310 through the first electronic device 301. That is, in the mobile infrastructure mode, regardless of a device such as an access point or a wireless router, the first electronic device 301 may serve as the access point. The first electronic device 301 may use a tethering function. The tethering function corresponds to an additional function of an electronic device having a communication function, and the electronic device may serve as a relay such as an access point in the tethering function. The second electronic device 302 or other electronic devices 303 may be connected to the base station 310 through the first electronic device 301 serving as the access point and may receive a wireless network service. A user may move a position of the first electronic device 301 and tethering may be performed within a range in which a communication connection with the first electronic device 301 can be made.

FIG. 4 illustrates a method of delivering a wireless communication system policy to the second electronic device connected to the first electronic device based on whether the first electronic device performs a tethering function according to various embodiments of the present disclosure.

Referring to FIG. 4, the processor 120 of the first electronic device 301 (for example, the electronic device 101) may perform the tethering function in operation 401. That is, the first electronic device 301 may be in a state where a communication module is activated to perform the tethering function. For example, the first electronic device 301 may be in a state where the first electronic device 301 serves as the network 162 of FIG. 1.

In operation 403, the processor 120 of the first electronic device 301 may identify whether the tethering function of the first electronic device 301 is released. A reference for determining whether the tethering function is released may be configured based on at least one of the various references such as time (for example, use time, alarm time, or predetermined time of the tethering function), place, battery level, data use amount, network congestion, user setting (for example, release of tethering function by user), and existence or nonexistence of the second electronic device connected to the first electronic device (for example, tethering function is released when there is no second electronic device). For example, the processor 120 of the first electronic device 301 may determine whether to release the tethering function according to whether a predetermined time has passed from a start time of the tethering function or whether the first electronic device 301 is located in a particular position. Alternatively, the processor 120 of the first electronic device 301 may determine whether to release the tethering function according to a battery level (for example, a measurement value of a current battery) or a measurement value of a data use amount. For example, when the battery level is lower than a preset battery level, the processor 120 of the first electronic device 301 may release the tethering function. Alternatively, when the battery level is higher than a measurement value of a preset data use amount, the processor 120 of the first electronic device 301 may release the tethering function. Further, the processor 120 of the first electronic device 301 may determine whether to release the tethering function according to network congestion, a user setting, or the existence or nonexistence of the second electronic device. The processor 120 of the first electronic device 301 may release the tethering function when a measurement value of the network congestion is larger than a preset value. Further, the processor 120 of the first electronic device 301 may determine whether to release the tethering function according to various references such as a user setting or the existence or nonexistence of the second electronic device. In addition, the processor 120 of the first electronic device 301 may receive a policy for offloading from a server connected to the wireless communication system and determine whether to release the tethering function based on the policy. When it is determined to not release the tethering function based on the aforementioned reference in operation 403, the processor 120 of the first electronic device 301 may continuously maintain the performance of the tethering function.

When there is a determination to release the tethering function in operation 403, the processor 120 of the first electronic device 301 may identify whether the second electronic device 302 connected to the first electronic device 301 is present in operation 405. That is, the processor 120 may identify whether the second electronic device 302 which is connected to the first electronic device 301 performing the tethering function to perform wireless communication exists. When the reference for releasing the tethering function corresponds to the presence or absence of the second electronic device connected to the first electronic device in operation 403, operation 405 may be included in operation 403. When the second electronic device is absent or not connected to the first electronic device, the first electronic device may release the tethering function. In operation 405, the processor 120 of the first electronic device 301 may transmit a discovery signal to identify whether the second electronic device 302 is present. When the processor 120 of the first electronic device 301 receives a response signal corresponding to the discovery signal from the second electronic device 302, the processor 120 may identify the presence of the second electronic device 302. When the processor 120 of the first electronic device 301 identifies the absence of the second electronic device 302 in operation 405, processor 120 may release the tethering function in operation 415.

When the processor 120 of the first electronic device 301 identifies the presence of the second electronic device 302 in operation 405, the processor 120 of the first electronic device 301 may receive information on policy types which can be used by the second electronic device 302 from the second electronic device 302 in operation 407. That is, in operation 407, the processor 120 of the first electronic device 301 may make a request for information on the policy types which can be used by the second electronic device 302 to the identified second electronic device 302. In response to the request, the second electronic device 302 may transmit information on the policy types which can be used by the second electronic device 302 to the first electronic device 301.

In operation 409, the processor 120 of the first electronic device 301 may receive information on policy types which can be serviced by the wireless communication system from a server (for example, the server 106 of FIG. 1). The server may be a server which can provide a wireless communication service by using the wireless communication system. The first electronic device 301 may be connected to the server through the base station 310. That is, in operation 409, the processor 120 of the first electronic device 301 may make a request for the information on the policy types which can be serviced by the wireless communication system to the server. In response to the request, the server may transmit the information on the policy types which can be serviced by the wireless communication system to the first electronic device 301. In operation 411, the processor 120 of the first electronic device 301 may identify whether the policy which can be used by the second electronic device 302 through the wireless communication system exists by comparing pieces of information on the policy types received in operation 407 and in operation 409. Operations 407 to 411 may correspond to an example of a pre-operation for determining whether the first electronic device 301 transmits a policy which can be used by the second electronic device 302 to the second electronic device 302. As another example of the pre-operation, when the first electronic device 301 identifies the presence of the second electronic device 302 connected to the first electronic device 301 in operation 405, the first electronic device 301 may receive information on policy types which can be serviced by the wireless communication system from the server. Further, the first electronic device 301 may transmit information on the policy types received from the server to the second electronic device 302.

In operation 411, the second electronic device 302 may identify whether the information on the policy types received from the first electronic device 301 is information which can be used by the second electronic device 302, and may transmit a result of the identification to the first electronic device 301. When the policy which can be used by the second electronic device 302 based on the result of the identification exists, the processor 120 of the first electronic device 301 may receive the policy information from the server and transmit the policy information to the second electronic device 302 in operation 413. A detailed description of operation 413 will be further made in a detailed description of FIG. 5C. In operation 415, the processor 120 of the first electronic device 301 may release the tethering function.

When there is no policy that can be used by the second electronic device 302 in operation 411, the processor 120 of the first electronic device 301 may generate its own policy to be used by the second electronic device 302 and transmit the generated its own policy (for example, its own policy information) to the second electronic device 302 in operation 417. In certain embodiments, its own policy generated by the processor 120 of the first electronic device 301 according to may include at least one of a Service Set Identifier (SSID), a cell ID, an Internet Protocol (IP) address, and a Media Access Control (MAC) address of another electronic device. For example, the processor 120 of the first electronic device 301 may generate its own policy based on at least one piece of information on cells adjacent to the first electronic device 301, information on APs adjacent to the first electronic device 301, information on a current cell of the first electronic device 301, information on electronic devices adjacent to the first electronic device 301, and information on electronic devices adjacent to the second electronic device 302. In operation 417, the processor 120 of the first electronic device 301 may transmit its own policy (for example, its own policy information) to the second electronic device 302. In operation 415, the processor 120 may release the tethering function.

Figure 5A:
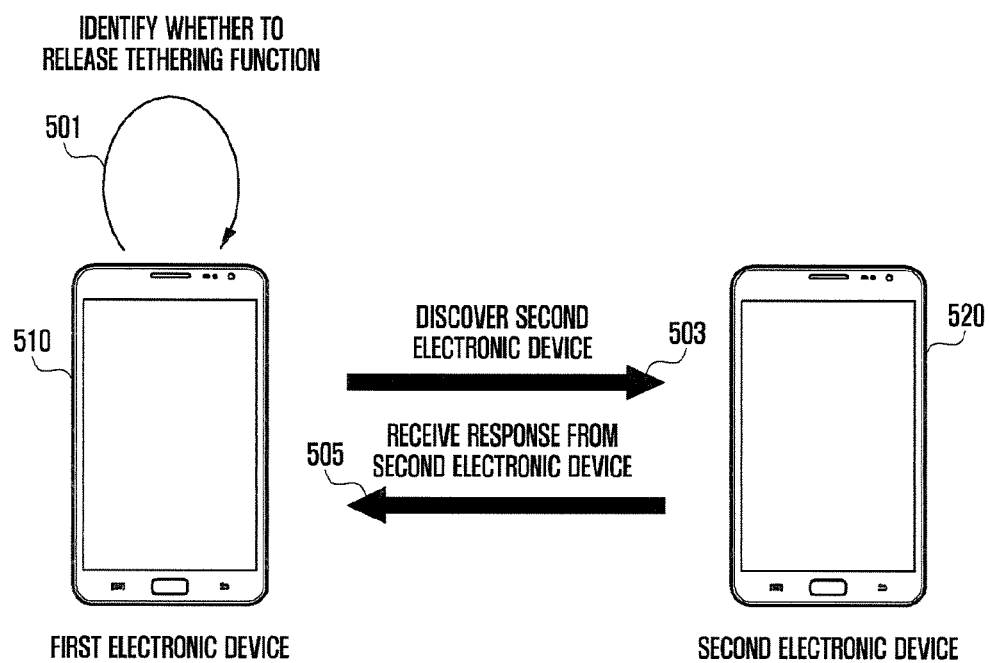
FIGS. 5A, 5B, and 5C illustrate a method of delivering a wireless communication system policy to a second electronic device connected to a first electronic device based on whether the first electronic device performs a tethering function according to embodiments of the present disclosure.
Figure 5B:
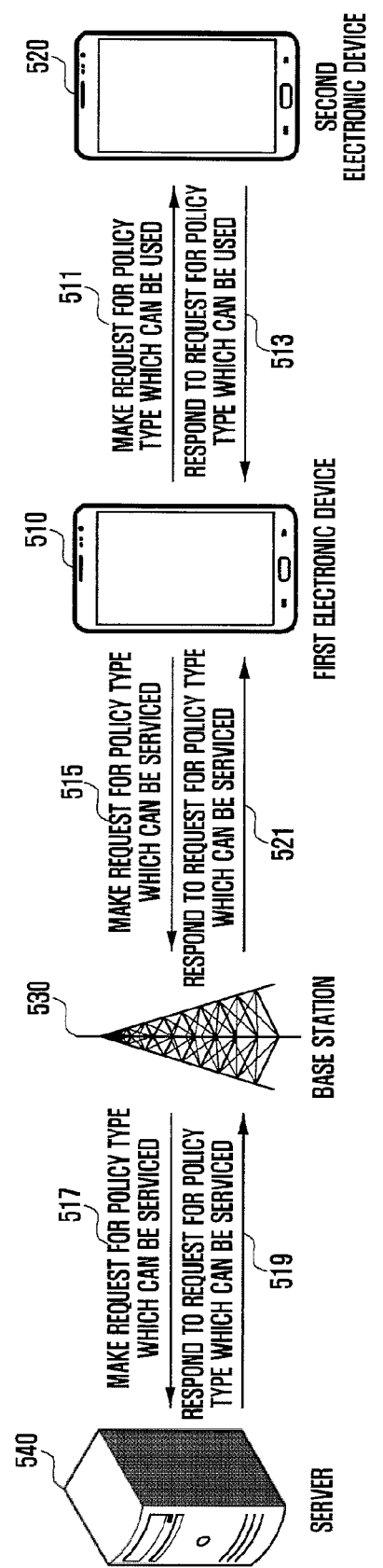
Figure 5C:
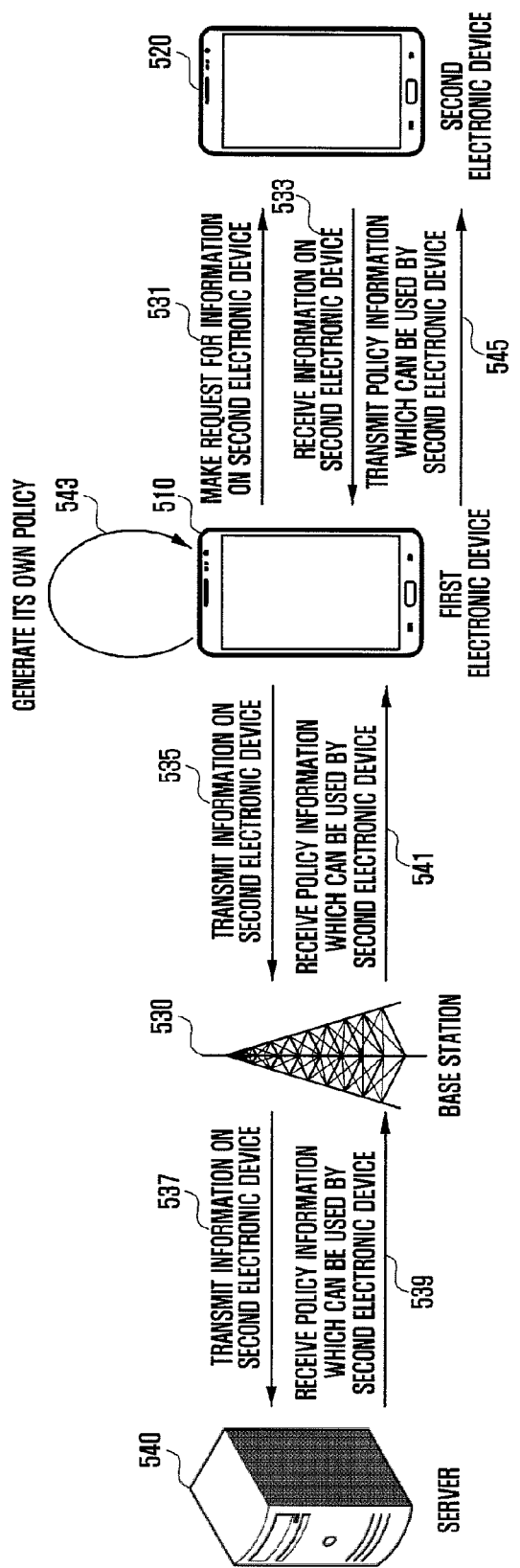

FIGS. 5A, 5B, and 5C illustrate a method of delivering a wireless communication system policy to the second electronic device connected to the first electronic device based on whether the first electronic device performs a tethering function according to an embodiment of the present disclosure.

According to an embodiment, referring to FIG. 5A, the first electronic device 510 may identify whether to release the tethering function in operation 501. For example, a reference for determining whether to release the tethering function is released may be configured based on at least one of the various references such as time (for example, use time, alarm time, or predetermined time of the tethering function), place, battery level, data use amount, network congestion, user setting (for example, release of tethering function by user), and presence or absence of the second electronic device connected to the first electronic device (for example, tethering function is released when there is no second electronic device). A method of determining the reference by the first electronic device 510 is described in a detailed description of operation 403 of FIG. 4 in detail.

In operation 503, when the first electronic device 510 identifies the release of the tethering function according to the reference, the first electronic device 510 may transmit a discovery signal for discovering the second electronic device 520. The discovery signal may be a signal for discovering the second electronic device 520 which is performing tethering with the first electronic device. The first electronic device 510 may control an intensity of the discovery signal to limit the discovered second electronic device 520 to the second electronic device located within a range in which tethering is possible.

In operation 505, the first electronic device 510 may receive a response signal from the second electronic device 520 in response to the discovery signal. When the response signal is received from the second electronic device 520, the first electronic device 510 may identify that the second electronic device 520 is connected to the first electronic device 510 through the tethering function of the first electronic device 510. When the reference for determining the release of the tethering function of the first electronic device 510 corresponds to the presence or absence of the second electronic device 520 connected to the first electronic device 510, a process of transmitting the discovery signal for discovering the second electronic device 520 may be omitted. That is, since the presence or absence of the second electronic device 520 connected to the first electronic device 510 is identified, the first electronic device 510 may make a request for information on policy types which can be used by the second electronic device 520 to the identified second electronic device 520 without the process of transmitting a discovery signal for discovering the second electronic device 520.

According to an embodiment, referring to FIG. 5B, the first electronic device 510 may send a request for information to the second electronic device 520, requesting information on the policy types that can be used by the second electronic device 520 in operation 511. In response to the request, the first electronic device 510 may receive, from the second electronic device 520, the information on the policy types that can be used by the second electronic device 520 in operation 513.

Further, the first electronic device 510 may make a request for information, to the base station 530, requesting information on the policy types which can be serviced in order to obtain information on policy types which can be serviced by the wireless communication system in operation 515. The base station 530 may be a relay which relays between the server 540 and the first electronic device 510. For example, when the first electronic device 510 is in a state where direct communication with the server 540 is possible without passing through the base station 530, the base station 530 may be omitted.

In operation 517, the base station 530 may make a request for information on the policy types which can be serviced to the server 540. In response to the request, the server 540 may transmit a response signal for the policy types which can be serviced to the base station 530 in operation 519. The response signal may be a signal including information on policy types which can be serviced by the wireless communication system. In operation 521, the first electronic device 510 may receive a response signal for the policy types which can be serviced from the base station 530. Like in the detailed description of operation 411 of FIG. 4, the first electronic device 510 may identify whether there is a policy which can be used by the second electronic device 520 through the wireless communication system by comparing information on policy types which can be used by the second electronic device 520 received from the second electronic device 520 with information on policy types which can be serviced by the wireless communication system received from the base station 530. Although not illustrated, the first electronic device 510 may receive information on policy types which can be serviced by the wireless communication system from the server 540 in another identification operation. The first electronic device 510 may transmit the information on the policy types to the second electronic device 520, and the second electronic device 520 may identify whether the information on the policy types can be used by the second electronic device 520. Further, the second electronic device 520 may transmit a result of the identification to the first electronic device 510. The first electronic device 510 may identify the policy which can be used by the second electronic device 520 based on the result of the identification received from the second electronic device 520. The aforementioned operation may be one of the various embodiments of the process in which the first electronic device 510 identifies the policy for offloading between different types of wireless communication systems which can be used by the second electronic device.

According to an embodiment, referring to FIG. 5C, when the first electronic device 510 identifies that the policy which can be used by the second electronic device 520 through the wireless communication system is present, the first electronic device 510 may transmit, to the second electronic device 520, policy information which can be used by the second electronic device 520. FIG. 5C illustrates a detailed process of operation 413 of FIG. 4.

In operation 531, the first electronic device 510 may make a request for information on the second electronic device 520 based on the policy which can be used. The information on the second electronic device 520 may be information on the second electronic device 520 required for generating the policy which can be used. In response to the request, the first electronic device 510 may receive the information on the second electronic device 520 in operation 533. For example, the information on the second electronic device 520 may include at least one of an International Mobile Station Identity (IMSI), phone number, manufacture's serial number, International Mobile Equipment Identity *IMEI), Global Positioning System (GPS) information, and cell ID of the second electronic device.

In operation 535, the first electronic device 520 may transmit the information on the second electronic device 520 to the base station 530. In operation 537, the base station 530 may transmit the information on the second electronic device 520 to the server 540. In operation 539, the server 540 may transmit policy information which can be used by the second electronic device 520 to the base station 530 based on the received information on the second electronic device 520. The policy information, which can be used by the second electronic device 520, may be information which has been identified by the first electronic device 510 based on the information on the second electronic device 520 for communication by the second electronic device 520. In operation 541, the first electronic device 510 may receive the policy information which can be used by the second electronic device 520 from the base station 530. In operation 545, the first electronic device 510 may transmit the policy information which can be used by the second electronic device 520 received from the base station 530 to the second electronic device 520. Further, the first electronic device 510 may release the tethering function.

According to an embodiment, referring to FIG. 5C, when the first electronic device 510 identifies that there is no policy which can be used by the second electronic device 520 through the wireless communication system, the first electronic device 510 may generate its own policy for the second electronic device 520 and transmit its own policy (for example, its own policy information) to the second electronic device 520. Operation 543 illustrated in FIG. 5C may be an operation similar to operation 417 of FIG. 4. When the first electronic device 510 identifies that there is no policy which can be used by the second electronic device 520 through the wireless communication system, the first electronic device 510 may generate its own policy to be used by the second electronic device 520 in operation 543. Its own policy generated by the first electronic device 510 may include at least one of a Service Set Identifier (SSID), a cell ID, an Internet Protocol (IP) address, and a Media Access Control (MAC) address of another electronic device which may be connected to the second electronic device 520 to perform communication. According to an embodiment, the first electronic device 510 may generate its own policy based on at least one piece of information on cells adjacent to the first electronic device, information on APs adjacent to the first electronic device, information on a current cell of the first electronic device, information on electronic devices adjacent to the first electronic device, and information on electronic device adjacent to the second electronic device.

In operation 545, the first electronic device 510 may generate its own policy and transmit its own policy (for example, its own policy information) to the second electronic device 520. Further, the first electronic device 510 may release tethering function.

Figure 6:
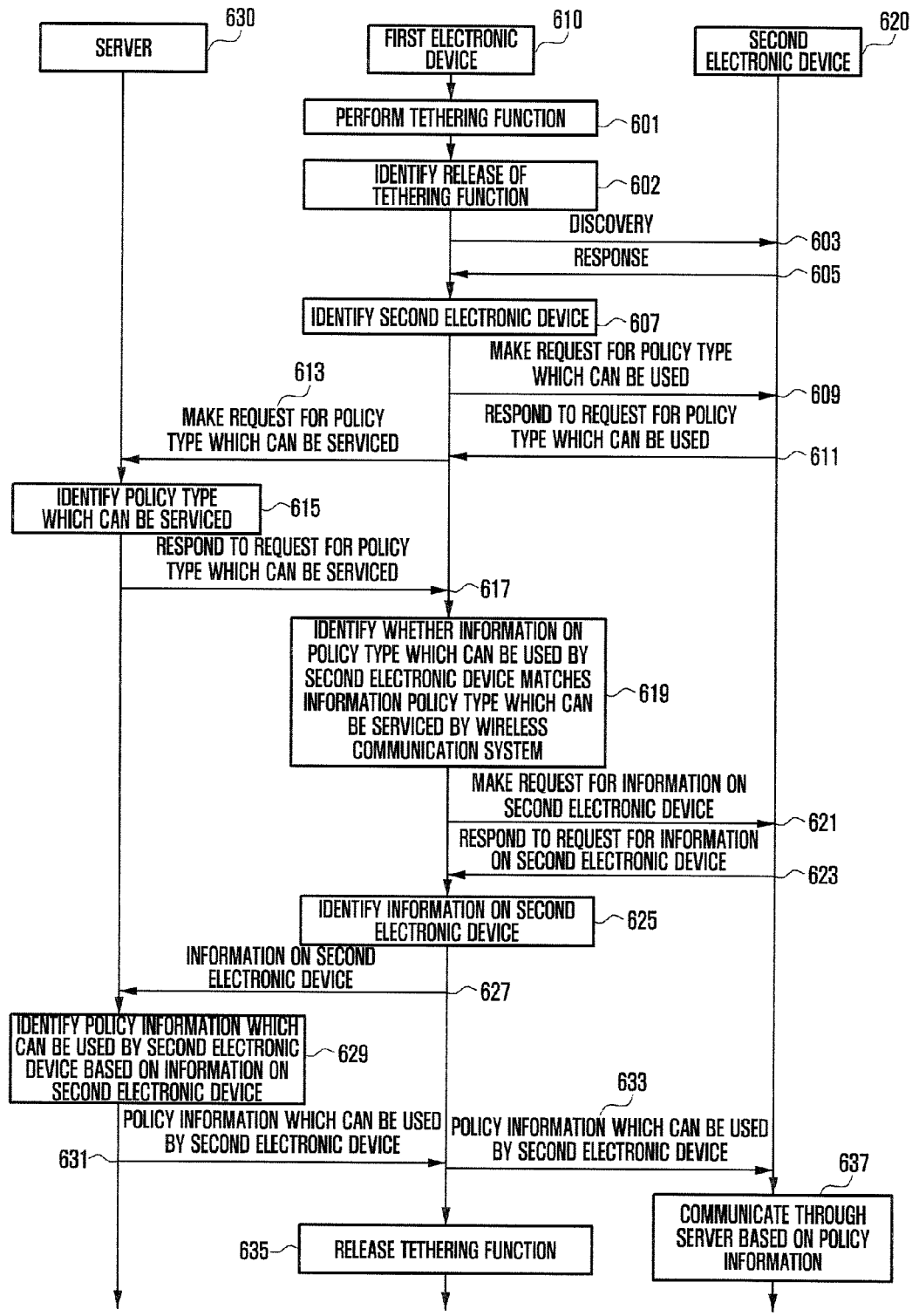
FIG. 6 illustrates a process of delivering a wireless communication system policy to a second electronic device connected to a first electronic device based on whether the first electronic device performs a tethering function according to embodiments of the present disclosure.

FIG. 6 illustrates a process of delivering a wireless communication system policy to the second electronic device connected to the first electronic device based on whether the first electronic device performs a tethering function according to an embodiment of the present disclosure.

Referring to FIG. 6 according to an embodiment of the present disclosure, the first electronic device 610 may perform the tethering function in operation 601. In operation 602, the first electronic device 610 may identify the release of the tethering function. For example, a reference for determining whether the tethering function is released may be configured based on at least one of the various references such as time (for example, use time, alarm time, or predetermined time of the tethering function), place, battery level, data use amount, network congestion, user setting (for example, release of tethering function by user), and presence or absence of the second electronic device connected to the first electronic device (for example, tethering function is released when there is no second electronic device). A method of determining the reference has been described in the detailed description of operation 403 of FIG. 4 in detail.

In operation 603, the first electronic device 610 may transmit a discovery signal for discovering the second electronic device 620 connected to the first electronic device 610. In operation 605, the first electronic device 610 may receive a response signal corresponding to the discovery signal from the second electronic device 620. However, when the reference for determining the release of the tethering function corresponds to the presence or absence of the second electronic device 620 connected to the first electronic device 610, operation 603 to operation 607 may be performed before operation 602.

In operation 607, the first electronic device 610 may identify the second electronic device 620 which performs wireless communication by using the tethering function of the first electronic device 610. After identifying the second electronic device 620, the first electronic device 610 may make a request for information on policy types which can be used by the second electronic device 620 to the second electronic device 620 in operation 609. In response to the request, the first electronic device 610 may receive information on the policy types which can be used by the second electronic device 620 from the second electronic device 620 in response to the request signal in operation 611.

In operation 613, the first electronic device 610 may make a request for information on the policy types which can be serviced by the server 630 to the server 630. The server 630 may identify the information on the policy types which can be serviced in operation 615, and transmit the information on the policy types which can be serviced by the server 630 to the first electronic device 610 in response to the request signal.

In operation 619, the first electronic device 610 may identify whether the information on the policy types which can be used by the second electronic device 620 matches the information on the policy types which can be serviced by the wireless communication system. In other words, the first electronic device 610 may identify whether the policy which can be used by the second electronic device through the wireless communication system exists. Operations 609 to 619 may be one example in which the first electronic device 610 receives a policy from the server 630 and transmits the policy to the second electronic device 620 or the first electronic device 610 generates its own policy and transmits its own policy to the second electronic device 620. For example, in another example, after operation 607, the first electronic device 610 may receive information on a policy type which can be serviced through the wireless communication system from the server 630. The first electronic device 610 may transmit the information on the policy type to the second electronic device 620, and the second electronic device 620 may identify whether the information on the policy type can be used by the second electronic device 620. Further, the second electronic device 620 may transmit a result of the identification to the first electronic device 610. The first electronic device 610 may identify the policy which can be used by the second electronic device 620 based on the result of the identification received from the second electronic device 620. The other embodiment described above may be one of the embodiments in which the first electronic device 610 identifies information on policy types which can be used by the second electronic device 620.

When information on at least one policy of the two policy types matches the information on the policy type which can be serviced by the wireless communication system in operation 619, the first electronic device 610 may make a request for information on the second electronic device related to the matched policy in operation 621. In response to the request, the first electronic device 610 may receive information on the second electronic device 620 from the second electronic device 620 in operation 623. The information on the second electronic device 620 may include at least one of an International Mobile Station Identity (IMSI), phone number, manufacture's serial number, International Mobile Equipment Identity (IMEI), Global Positioning System (GPS) information, and cell ID of the second electronic device. The first electronic device 610 may identify the information on the second electronic device 620 in operation 625. The first electronic device 610 may transmit the information on the second electronic device 620 in operation 627. In operation 629, the server 630 may identify policy information which can be used by the second electronic device 620 based on the received information on the second electronic device 620. The policy information which can be used by the second electronic device 620 may be information which can be provided by the server 630 for communication by the second electronic device. In operation 631, the first electronic device 610 may receive the policy information which can be used by the second electronic device 620 from the server 630.

In operation 633, the first electronic device 610 may transmit the policy information which can be used by the second electronic device 620 to the second electronic device 620. Further, the first electronic device 610 may release the tethering function in operation 635.

In operation 637, the second electronic device 620 may be connected to the wireless communication system (for example, cellular or WLAN) to perform communication based on the policy information which can be used by the second electronic device 620, which has been received from the first electronic device 610. Order of the aforementioned operations may change according to embodiments.

Figure 7:
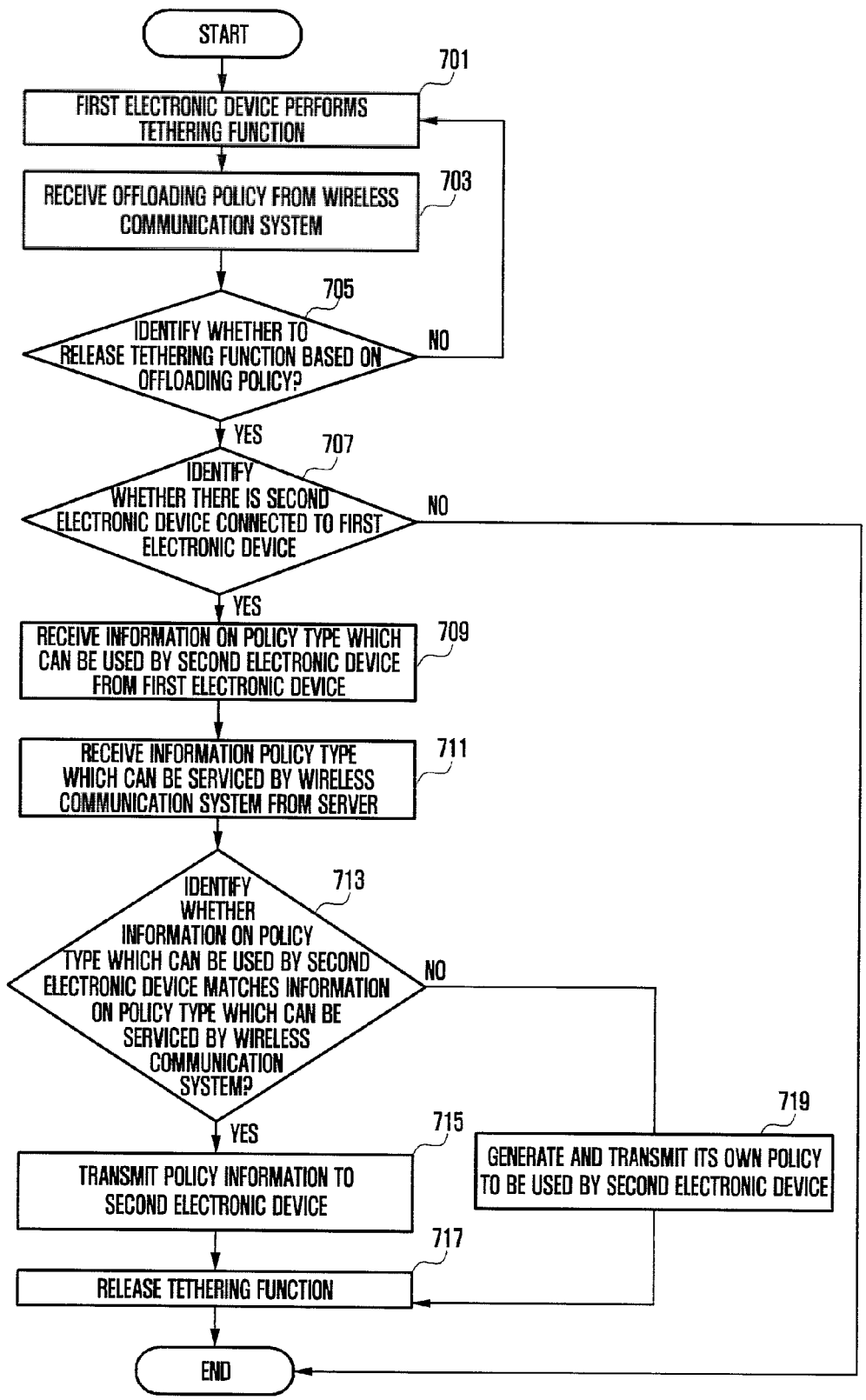
FIG. 7 illustrates a method of delivering a wireless communication system policy to a second electronic device connected to a first electronic device according to whether the first electronic device performs a tethering function determined based on an offloading policy of the wireless communication system.

FIG. 7 illustrates a method of delivering a wireless communication system policy to the second electronic device connected to the first electronic device according to whether the first electronic device performs a tethering function determined based on an offloading policy of the wireless communication system.

Referring to FIG. 7, the processor 120 of the first electronic device 301 (for example, the electronic device 101) may perform the tethering function in operation 701. In operation 703, the processor 120 of the first electronic device 301 may receive an offloading policy (for example, policy information for offloading) from the wireless communication system. For example, the processor 120 of the first electronic device 301 may be in a state where the first electronic device 301 is connected through a cellular communication system to perform wireless communication as backhaul. Further, the processor 120 of the first electronic device 301 may be in a state where the first electronic device 301 performs the tethering function. The first electronic device may receive a policy for offloading to a WLAN communication system from the server (for example, the server 106 of FIG. 1). According to the policy received from the server, the first electronic device 301 may change the communication system from the cellular communication system to the WLAN communication system.

In operation 705, the processor 120 of the first electronic device 301 may identify whether to release the tethering function based on the offloading policy received from the server. When there is a determination to release the tethering function based on the offloading policy in operation 705, the processor 120 of the first electronic device 301 may identify whether the second electronic device 302 connected to the first electronic device 301 exists in operation 707. Hereinafter, operations 707 to 719 may be a process similar to operations 405 to 417 of FIG. 4. Since the operations have been described in the detailed description related to FIG. 4, descriptions of operations 707 to 719 will be omitted.

According to various embodiments, at least some of the devices (for example, modules or functions thereof) or the method (for example, operations) according to the present disclosure may be implemented by a command stored in a computer-readable storage medium in a programming module form. When the command is executed by one or more processors, the one or more processors may perform a function corresponding to the command. The computer-readable storage medium may be, for example, the memory. At least some of the programming modules may be implemented (for example, executed) by, for example, the processor. At least a part of the programming module may include, for example, a module, a program, a routine, a set of instructions and/or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Although the present disclosure has been described with embodiments, various changes and modifications may be suggested to one skilled in the art. It is intended that the present disclosure encompass such changes and modifications as fall within the scope of the appended claims.

What is claimed is:

1. A method of delivering policy information for offloading between different types of wireless communication systems by a first electronic device, the method comprising:
  connecting the first electronic device with a second electronic device based on a tethering function;
  determining, by the first electronic device, whether to release the tethering function;

receiving, from the second electronic device, information on policy types that can be used by the second electronic device;
identifying policy information corresponding to the second electronic device based on the received infoiuiation on the policy types to connect the second electronic device with a wireless communication system when the tethering function is released;
delivering the policy information for offloading between different types of wireless communication systems to the second electronic device; and
releasing the tethering function after delivering the policy information to the second electronic device.

2. The method of claim 1, wherein the determining of whether to release the tethering function comprises determining the release of the tethering function based on at least one of use time of the tethering function, alarm time, predetermined time, place, battery level, data use amount, network congestion, release of tethering by a user, and presence or absence of the second electronic device connected to the first electronic device.

3. The method of claim 1, wherein the determining of whether to release the tethering function comprises:
receiving policy information for offloading from a server connected to a wireless communication system; and
determining whether to release the tethering function based on the received policy information for offloading.

4. The method of claim 3, wherein the wireless communication system includes a communication system defined based on 3GPP.

5. The method of claim 3, wherein the policy information for the offloading corresponds to policy information for offloading from a cellular communication system to a Wireless Local Area Network (WLAN) communication system.

6. The method of claim 1, wherein the delivering of the policy information comprises:
determining at least one of policy information corresponding to the second electronic device to connect the second electronic device with a wireless communication system; and
one of:
receiving the at least one of policy information from a server, and delivering the received policy information to the second electronic device, and
generating, by the first electronic device, own policy information corresponding to the second electronic device, and delivering the generated own policy information to the second electronic device.

7. The method of claim 6, wherein the generating of the own policy information comprises generating the own policy information by using at least one of information on cells adjacent to the first electronic device, information on access points (APs) adjacent to the first electronic device, information on a current cell of the first electronic device, and information on electronic devices adjacent to the second electronic device.

8. The method of claim 6, wherein the receiving of at least one of policy information from the server comprises:
receiving information corresponding to the second electronic device from the second electronic device;
transmitting the information corresponding to the second electronic device to the server; and
receiving at least one of policy information identified based on the transmitted information from the server.

9. The method of claim 8, wherein the information corresponding to the second electronic device includes at least one of an IMSI, phone number, manufacturer's serial number, IMEI, GPS information, and cell ID.

10. The method of claim 1, wherein the policy information is transmitted from an ANDSF server or an ANQP server.

11. The method of claim 1, wherein the second electronic device is connected to the first electronic device based on a wire communication or a wireless communication.

12. A first electronic device comprising:
a communication module configured to connect the first electronic device with other electronic devices based on wireless communication; and
a processor configured to:
connect with a second electronic device based on a tethering function, determine whether to release the tethering function,
receive, from the second electronic device, information on policy types that can be used by the second electronic device,
identify policy information corresponding to the second electronic device based on the received information on the policy types to connect the second electronic device with a wireless communication system when the tethering function is released,
deliver the policy information for offloading between different types of wireless communication systems to the second electronic device, and
release the tethering function after delivering the policy information to the second electronic device.

13. The first electronic device of claim 12, wherein the processor is further configured to determine whether to release the tethering function based on at least one of use time of the tethering function, alarm time, predetermined time, place, battery level, data use amount, network congestion, release of tethering by a user, and existence or nonexistence of the second electronic device connected to the first electronic device.

14. The first electronic device of claim 12, wherein the processor is further configured to:
receive policy information for offloading from a server connected to a wireless communication system, and
determine whether to release the tethering function based on the received policy information for the offloading.

15. The first electronic device of claim 14, wherein the policy information for the offloading corresponds to policy information for offloading from a cellular communication system to a WLAN communication system.

16. The first electronic device of claim 12, wherein the processor is further configured to:
determine at least one of policy information corresponding to the second electronic device to connect the second electronic device a wireless communication system; and
one of:
receive the at least one of policy information from a server, and deliver the received policy information to the second electronic device, and
generate own policy information corresponding to the second electronic device, and deliver the generated own policy information to the second electronic device.

17. The first electronic device of claim 16, wherein the processor receives information corresponding to the second electronic device from the second electronic device, transmits the information corresponding to the second electronic device to the server, and receives at least one of policy information identified based on the transmitted information from the server.

18. The first electronic device of claim 17, wherein the information corresponding to the second electronic device includes at least one of an IMSI, phone number, manufacturer's serial number, IMEI, GPS information, and cell ID.

19. The first electronic device of claim 16, wherein the processor is further configured to generate its own policy by using at least one of information on cells adjacent to the first electronic device, information on APs adjacent to the first electronic device, information on a current cell of the first electronic device, and information on electronic devices adjacent to the second electronic device.

20. A non-transitory computer-readable recording medium embodying a program for delivering policy information for offloading between different types of wireless communication systems by a first electronic device, that when executed by a processing device, causes the processing device to:

connect the first electronic device with a second electronic device based on a tethering function;

determine, by the first electronic device, whether to release the tethering function;

receive, from the second electronic device, information on policy types that can be used by the second electronic device;

identify policy information corresponding to the second electronic device based on the received information on the policy types to connect the second electronic device with a wireless communication system when the tethering function is released;

deliver the policy information for offloading between different types of wireless communication systems to the second electronic device; and releasing the tethering function after delivering the policy information to the second electronic device.

* * * * *